(12) United States Patent
Handwerker

(10) Patent No.: US 6,317,902 B2
(45) Date of Patent: Nov. 20, 2001

(54) POOL COVER AND THE LIKE HAVING INTEGRAL REFLECTIVE SOLAR HEATING AND INSULATIVE MEANS

(75) Inventor: Gary Handwerker, Northfield, IL (US)

(73) Assignee: Midwest Canvas Corporation, Chicago, IL (US)

( * ) Notice: Subject to any disclaimer, the term of this patent is extended or adjusted under 35 U.S.C. 154(b) by 0 days.

(21) Appl. No.: 09/863,641

(22) Filed: May 23, 2001

Related U.S. Application Data

(63) Continuation of application No. 08/650,883, filed on Nov. 12, 1996.

(51) Int. Cl.$^7$ ....................................................... E04H 4/10
(52) U.S. Cl. ............................................................... 4/498
(58) Field of Search .................................................. 4/498

(56) References Cited

U.S. PATENT DOCUMENTS

| | | |
|---|---|---|
| 3,072,920 | 1/1963 | Yellott . |
| 4,028,750 | 6/1977 | Gustafsson . |
| 4,426,995 | 1/1984 | Wilson . |
| 4,709,688 | 12/1987 | Paradis . |

OTHER PUBLICATIONS

Frank E. Edlin "Plastic Glazing for Solar Energy Absorption Collectors" Solar Energy, vol. 2, No. 2, Apr. 1958, pp. 3–6.

Primary Examiner—Robert M. Fetsuga
(74) Attorney, Agent, or Firm—Lee, Mann, Smith, McWilliams, Sweeney & Ohlson; Howard Rockman

(57) ABSTRACT

An improved lightweight, multi-layer, reflective swimming pool cover containing two thermoplastic layers. The top layer has a dark-colored polyethylene film and the lower layer has a polyethylene film with a aluminum concentrate, or other suitable reflecting material, deposited thereon along the entire layer, thereby becoming a reflective surface. The layers are suitably bonded together to form a water and air tight seal so as to provide the cover with a reflective surface on which are integral reflective solar heating and insulative pockets configured in a predetermined spatial relationship to each other. The cover acts to continually reflect radiating heat back into the pool and provides an effective and enhanced insulation barrier against radiant heat loss from the pool.

9 Claims, 1 Drawing Sheet

POOL COVER AND THE LIKE HAVING INTEGRAL REFLECTIVE SOLAR HEATING AND INSULATIVE MEANS

This application is a continuation of application Ser. No. 08/650,883, filed Nov. 12, 1996.

FIELD OF THE INVENTION

This invention relates to lightweight, multi-layer reflective swimming pool covers and the like, and more particularly to, a swimming pool cover containing multiple thermoplastic film layers suitably bonded together so as to provide the cover containing an integral reflective surface on which are integral reflective solar heating and insulative pockets configured in a spatial relationship to each other.

BACKGROUND OF THE INVENTION

Generally, heating a swimming pool, hot tub, etc., represents the single biggest recurring operating expense facing the owner. Various types of lightweight, buoyant, multi-layer swimming pool covers exist in the prior art which serve multiple purposes such as retaining as much of the water's heat as possible, preventing or minimizing evaporation of the water over time, and keeping dirt and other debris out of the pool. Often the pool covers are placed on the pool, more often than the pool is actually used by the owner, especially for pools that are outdoors, where the cover remains on the pool for extended periods of time. One of the lightweight, multi-layer covers of the prior art has a thermoplastic top layer, the top layer having integral insulative air pockets which act to trap and focus the solar heat into the water. This top layer is suitably joined or otherwise bonded to a thermoplastic bottom layer, the two layers forming the cover. During the solar heating of the water, this particular cover allows the light to pass through the cover to heat the water, but does not reflect heat down into the water. Also, during the solar heating the insulative air pockets act as individual solar prisms, the effect of which is to heat the interior air within each insulative air pocket, thereby allowing a total insulation barrier to be effectuated for the whole cover. Consequently, it would be an advantage for a lightweight, multi-layer, reflective swimming pool cover to have the ability to provide solar heating of the pool during the day utilizing an additional reflective thermoplastic layer, thereby improving the efficiency of the cover during use, without increasing the number of layers or weight of the cover. And it would also be a further advantage if the cover would also be able to provide the insulative feature for the pool during the night hours, thereby using the reflective layer to continually reflect radiating heat back into the water, both features acting in concert to reduce the operating expense that is associated with the heating of the pool somewhat over time.

Depending on the size of the pool to be covered, the costs of the various types of lightweight multi-layer covers in the prior art are relatively expensive to purchase. It would be an advantage in the art if a swimming pool cover could be made relatively inexpensively utilizing long-lasting lightweight thermoplastic film layers, yet having features like reflective integral air-pockets for reflective solar heating and insulation, which other more expensive covers do not have.

The present invention overcomes these and other problems inherent in existing lightweight, multi-layer covers for swimming pools and the like. The present invention combines a heat reflective layer with an insulative layer which improves the effectiveness of the cover without significantly or materially increasing the thickness or weight of the cover.

OBJECTS OF THE INVENTION

The principle object of the present invention is to provide a lightweight, multilayer, pool cover having an integral reflective surface which acts to reflect heat back into the pool which improves the effectiveness of the cover.

Another object of the present invention is to provide a lightweight, multi-layer pool cover having integral reflective solar heating pockets and insulation pockets in a spatial relationship to each other which act to reflect heat back into the pool which improves the effectiveness of the cover without materially increasing the thickness or weight of the cover.

Another object of the present invention is to provide a lightweight, multi-layer pool cover which is relatively inexpensive to manufacture and long-lasting. Still further objects and advantages will become apparent from a consideration of the ensuing description and drawings.

SUMMARY OF THE INVENTION

These and other objects are achieved by the presently disclosed improved lightweight, multi-layer swimming pool cover. In the improved invention there is provided a pool cover that has first and second translucent layers of a predetermined size. The first layer has a first surface and a second surface opposite thereof, the first layer having a dark colored film applied thereto. The second layer has a first surface and a second surface opposite thereof, the second layer having a plurality of air-pockets integral therewith in a predetermined spaced relationship to each other, the second layer having a heat reflective film applied thereto to one of the surfaces. The heat radiating from the pool is reflected by the pool cover back into the pool.

DETAILED DESCRIPTION OF THE PREFERRED EMBODIMENT

Figure 1A:
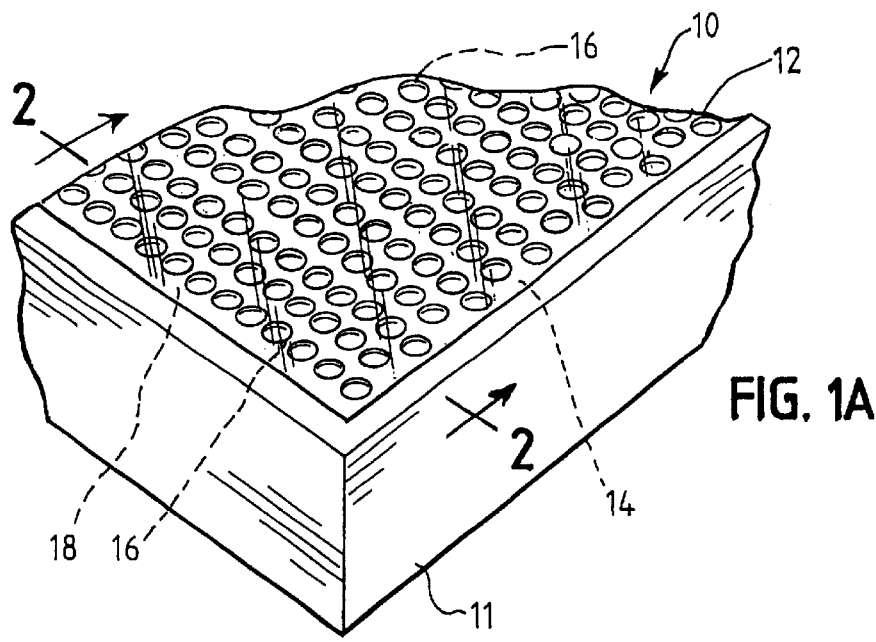
FIG. 1A is a partial perspective view of the lightweight, multi-layer, reflective swimming pool cover of the present invention during normal use with the reflective surface positioned down.

FIG. 1A is a partial perspective view of the lightweight, multi-layer, reflective swimming pool cover built in accordance with the present invention during normal use with the reflective surface positioned down. In FIG. 1A, the swimming pool cover 10 comprises an upper thermoplastic layer 12 and a lower thermoplastic reflective layer 14 that are sealed together by thermoplastic manufacturing practices that are common and well known to the industry, resulting in a single-piece pool cover that is air tight, water tight and buoyant. While the swimming pool cover 10 is positioned over a swimming pool 11, it is understood that this depiction is only illustrative and the cover 10 may be used for hot tubs, and the like. The swimming pool cover 10 may be constructed in any shape and size including rectangular, square, circular or particular shapes for specific uses, and may be fabricated in a manner along the peripheral edge to facilitate easy placement on the water in a swimming pool using conventional, well understood means. When the cover 10 is properly being used the lower layer 14 will be in continuous contact with the water in the pool. Under normal operating conditions the cover 10 will be long-lasting and mildew resistant.

The upper thermoplastic layer 12 is a single-ply of dark colored polyethylene film. Through the process of solar heating the dark color of this upper layer 12 will act to draw heat into the pool thereby acting to increase the temperature of the water contained in the pool.

The lower reflective layer 14 is a single-ply of polyethylene film which has an aluminum concentrate, or other suitable reflective material (e.g., such as silver concentrate), uniformly deposited along the whole interior surface. The lower reflective layer 14 is preferably constructed of air-filled pockets 16, or like insulative elements, as illustrated, preferably extending vertically from the surface approximately a quarter- inch in height. The air-filled pockets 16 may be constructed of any shape or height. The insulative pockets 16 are disposed in a spaced relation to each other on the surface of the lower reflective layer 14, defining open spaces 18 between them. The insulative pockets 16 have the same interior reflective surface as the lower layer 14. Accordingly, each of the individual pockets 16 have a dual purpose, namely, to operate as an enhanced or improved solar prism by reflecting radiant heat loss from the pool 11 by reflecting radiating heat back into the pool, and, since each pocket encapsulates a particular volume of air (or other suitable insulative gas), each pocket helps effectuate an effective and enhanced insulation barrier to help minimize the radiant heat loss from the pool. The result is that the whole lower layer 14 is allowed to function as an effective insulation barrier to radiant heat loss from the pool 11 by reflecting radiating heat back into the pool. This dual purpose serves to improve the effectiveness and efficiency of the cover during operation.

The lower reflective layer 14 consists of a particular single-ply of polyethylene film having the suitable reflective material deposited on the film which is commercially available under the following technical data specification, namely, under the product name of Silver, product number MT1065F (LDR: 33/1, Resin: LDPR, Carrier: 60–65% LDPR) from the vendor Color Master, Inc. of Avilla, Ind. 46710.

As noted, through the process of solar heating the dark color of this upper layer 12 will act to draw heat into the pool thereby acting to increase the temperature of the water contained in the pool, while the lower layer 14 will act to reflect heat radiation originating from the pool back into the pool. The efficiency that is inherent in this innovation is that it will take less heat, say only 70 degrees F., to maintain a particular temperature for the water, say 80 degrees F., because of the reflection of the heat radiation back into the pool by the reflective surface of the lower layer of the cover.

Figure 1B:
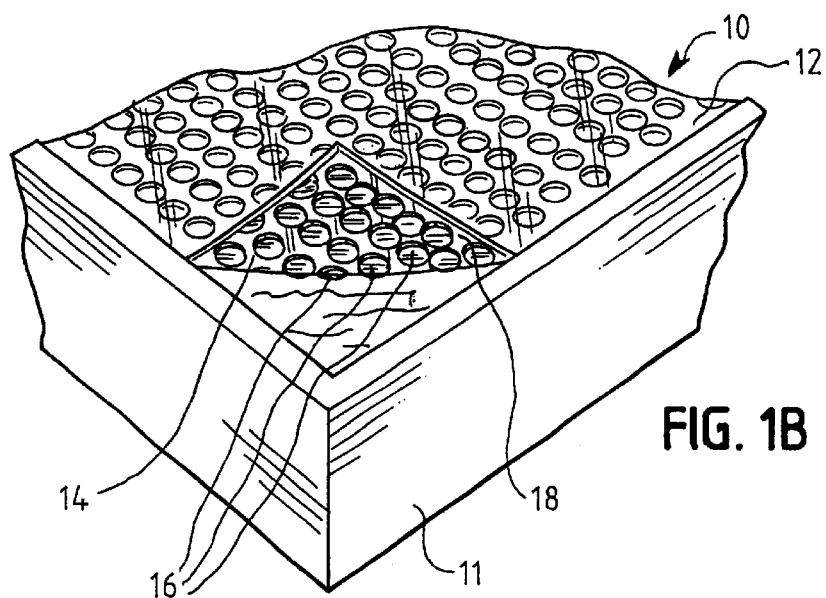
FIG 1B is a partial perspective view of the lightweight, multi-layer, reflective swimming pool cover of the present invention during normal use with the reflective surface positioned down and with a corner turned back to illustrate the insulative air-pockets.

FIG. 1B is a partial perspective view of the lightweight, multi-layer, reflective swimming pool cover built in accordance with the present invention during normal use with the reflective surface positioned down and with a corner turned back to illustrate the insulative air-pockets. In FIG. 1B, the cover 10 is extremely pliable and thin. When the cover 10 is used, the lower layer 14 will be in continuous contact with the water in the pool.

Figure 2:
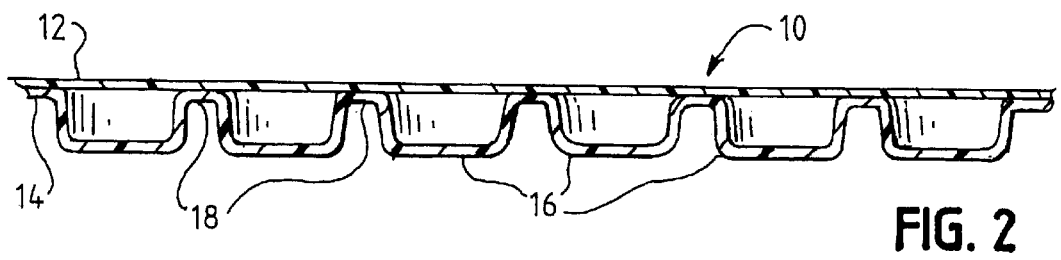
FIG. 2 is an expanded cross-sectional view taken through line 2—2 of FIG. 1A.

FIG. 2 is an expanded cross-sectional view taken through line 2—2 of FIG. 1A. In FIG. 2, the heat radiating from the pool is depicted by heat arrows 20. As previously noted, the process of solar heating will act to draw heat into the pool through the entire dark colored top layer 12 of the cover 10, while the entire lower reflective layer 14, which contains numerous insulative pockets 16 and numerous open spaces 18, will act to reflect any escaping heat radiation originating from the pool back into the pool by both the pockets 16 and the open spaces 18.

Although the foregoing detailed description of the present invention has been described by reference to a single embodiment, it will be understood that modifications in the structure and arrangement of this embodiment other than what specifically has been set forth herein may be achieved by those skilled in the art and that such modifications are to be considered as being within the over all scope of the present invention.

I claim:

1. A lightweight, multi-layer cover for a swimming pool containing water comprising:

an upper layer of a predetermined size;

a lower reflective layer of a predetermined size, said lower reflective layer having a surface partially in contact with and beneath the upper layer, and a second surface opposite the first surface;

the lower reflective layer adapted to contact the water when the cover is in use;

said lower reflective layer having a plurality of pockets integral thereto in a predetermined spaced relationship to each other, said pockets having a predetermined shape and size and extending a predetermined distance downward from the second surface;

the lower reflective layer also including a reflective surface adapted to reflect heat directed from the pool water toward said lower reflective layer to reflect a substantial amount of the heat radiating from the pool water back towards the pool water;

the upper layer and the lower reflective layer operatively sealed together where the upper layer is in contact with the lower reflective layer to provide an air and water tight seal for the pockets.

2. The cover of claim 1 wherein the upper layer is a single-ply thermoplastic film of a predetermined thickness.

3. The cover of claim 1 wherein the lower reflective layer is a single-ply thermoplastic film having a predetermined thickness.

4. The cover of claim 1 wherein the reflective surface comprises an aluminum concentrate.

5. The cover of claim 1 wherein the reflective surface of the lower reflective layer comprises a reflective film applied to at least one of the first and second surfaces of the lower reflective layer.

6. The cover of claim 1 wherein the upper layer comprises a translucent material.

7. The cover of claim 1 wherein the lower reflective layer comprises a translucent material.

8. The cover of claim 1 wherein the upper layer comprises a translucent material, and the lower reflective layer comprises a substantially translucent material.

9. The cover of claim 1 wherein said lower reflective layer has a reflective surface film applied to one of said first and second surfaces of said lower reflective layer.

* * * * *